United States Patent Office 3,226,987
Patented Jan. 4, 1966

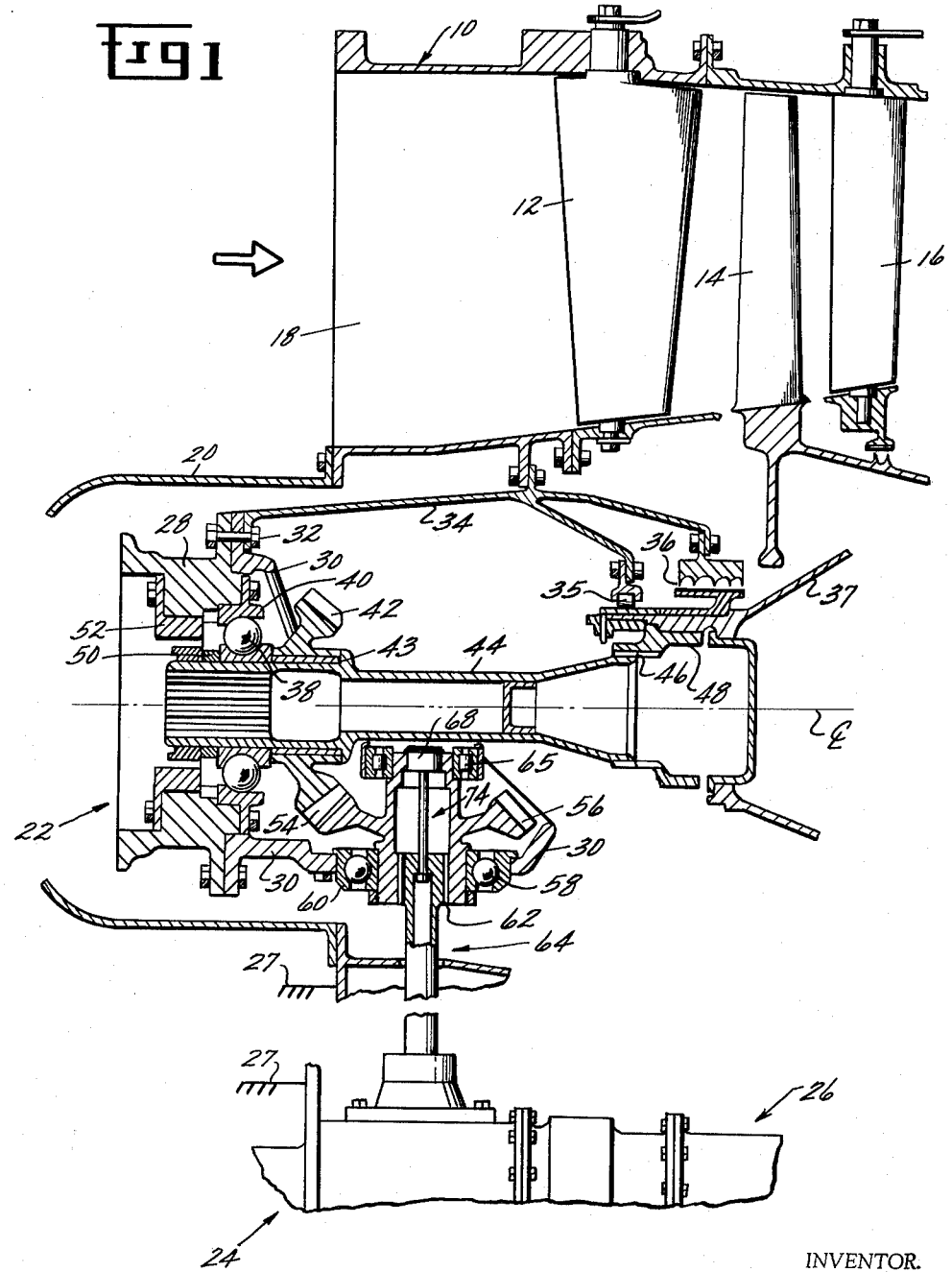

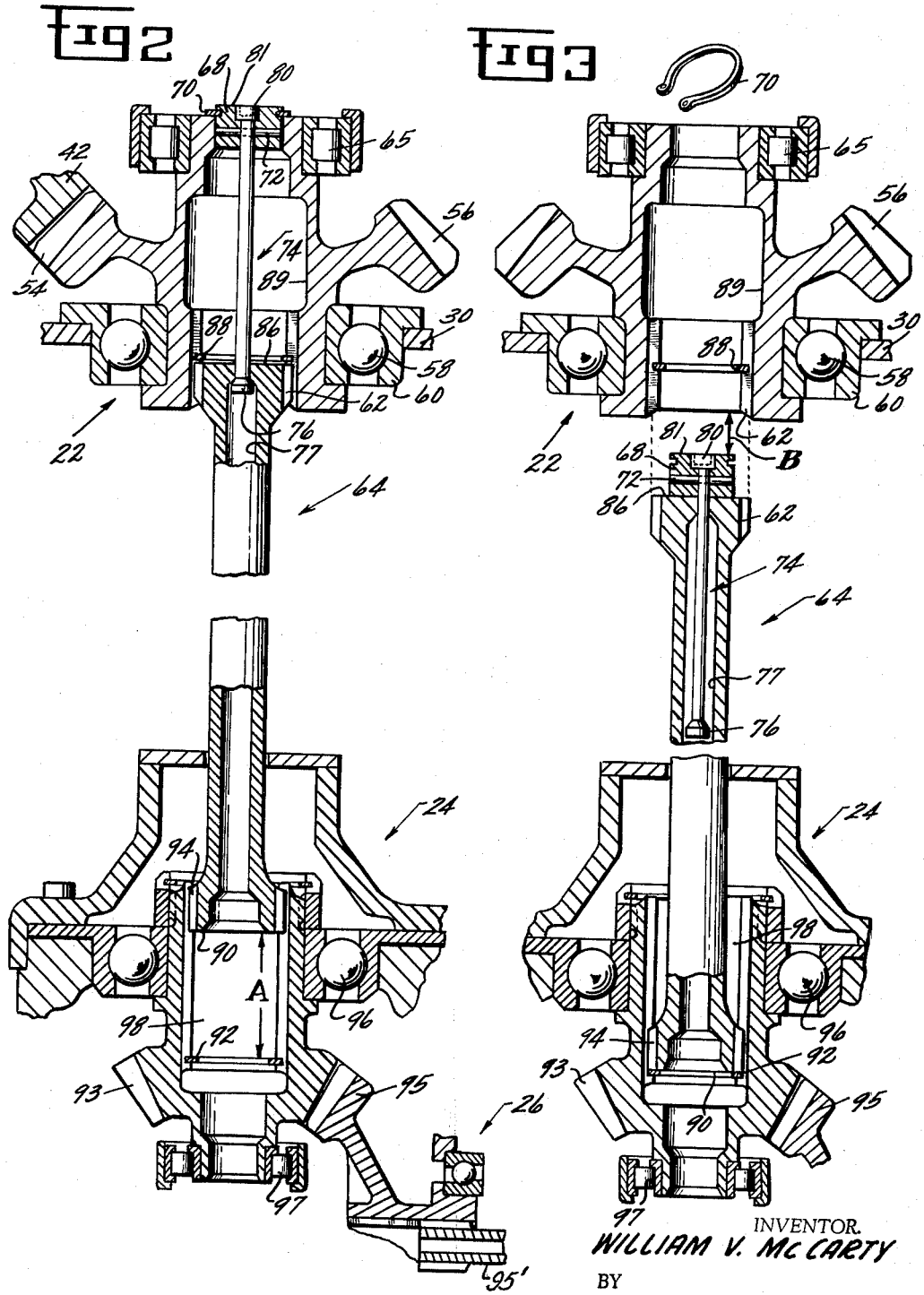

3,226,987
GEAR ASSEMBLY
William V. McCarty, Cincinnati, Ohio, assignor to General Electric Company, a corporation of New York
Filed Oct. 29, 1963, Ser. No. 319,780
5 Claims. (Cl. 74—15.63)

This invention relates to a gear assembly and, more particularly, to an arrangement for expeditious detachment of a gear assembly used, for example, in conjunction with powering externally-mounted controls and accessories for use with an aircraft gas turbine engine, wherein several gear assemblies are fixedly mounted on the engine one with respect to the other and have driving connections therebetween.

One of the prime sources of motive power for aircraft today is the turbojet engine. This engine may typically comprise an axial flow compressor having one or more stages of rotating wheel or disk members having airfoil members; a combustion system for burning the air compressed by the compressor with fuel, and a power turbine section. The power turbine section supplies the power necessary to turn the compressor rotor and is mounted on a common main engine rotor shaft with the compressor rotor, the shaft extending axially of the engine. The work remaining in the hot gas stream, after it exits from the turbine section, is converted into thrust which reacts against the engine to provide the motive power for the aircraft in which the engine is mounted. A turbojet engine, as is the case with any engine, requires a number of controls and accessories. For example, fuel injectors, fuel nozzles, fuel pumps, lubrication pumps, temperature detectors, and the like must be provided. These components may be mounted within the engine or, as is typical, on the outer casing or housing thereof. In the case of the lube and fuel pumps, for example, means must be provided to power these devices to cause flow of fuel and lubrication oil to the engine combustion chambers and bearings, respectively. It is common practice to provide a power take-off arrangement from the main engine rotor shaft by use of a smaller auxiliary shaft splined to the main rotor shaft at the forward end of the engine. A forward or inlet gearbox assembly is also usually provided with a suitable gearing arrangement whereby the inlet gearbox auxiliary shaft is drivingly connected to an accessory driveshaft. Thus, there may be provided a system of meshing bevel gears, one of which is mounted on the small auxiliary driveshaft splined to the main rotor shaft hub, the other gear being in turn connected to the accessory driveshaft. It has also been found to be desirable to mount the fuel or lube pump driving gears separately from the inlet gearbox for easy maintenance and removal or replacement when worn or damaged. Thus, an arrangement may be utilized wherein the inlet gearbox is drivingly connected by the accessory or transfer shaft to a transfer gearbox mounted on the outer casing at the periphery thereof. The transfer gearbox in turn may be connected to a rear gearbox located centrally of the engine for facilitating the supply of lubrication oil or fuel. Since the gearboxes are fixedly mounted relative one to the other and a shaft extends between them, it has been necessary in the past to remove or at least partially dismantle both gearboxes when it is only required to repair or remove one of a pair of interconnected gearboxes. Moreover, it is frequently necessary to obtain access to the interior of the engine, in particular, the rotor shaft and lubrication sump areas at the rear of the inlet gearbox, to inspect seals and bearings. This has required not only the removal of the inlet gearbox assembly but also disconnecting the gears which are connected to the transfer driveshaft and at least partial dismantling of the transfer gearbox itself. Obviously, the expense caused by the time and labor involved with such an arrangement can be a significant part of an aircraft operator's maintenance costs.

Accordingly, a general object of the present invention is to provide an improved arrangement for disassembly of one gearbox in a multiple gearbox arrangement wherein the gearboxes are drivingly interconnected one to the other and fixedly mounted on the same mounting structure.

A more specific object of the present invention is to provide means for removal of the main or primary inlet gearbox from the main power take-off point at the hub of an engine rotor shaft for repair or replacement thereof, or inspection of the shaft and associated bearing and seal surfaces, without the necessity of removing a second or third gearbox fixedly mounted with respect to the inlet gearbox and having a driving connection therewith in the form of engaged gears.

Briefly, in one embodiment of my invention, I provide: (1) an inlet gearbox assembly including a first auxiliary driveshaft extending longitudinally thereof, first bearing means supporting the driveshaft, a first housing member supporting the bearing means, and a first bevel gear fixed to the first driveshaft and mounted for rotation therewith; (2) a second gearbox assembly including a second auxiliary driveshaft, second bearing means supporting the second driveshaft, a second housing member supporting the second bearing means, and a second bevel gear fixed to the second driveshaft for rotation therewith; (3) a transfer driveshaft; and (4) a pair of transfer gear means connected at either end of the transfer driveshaft, one each of the pair being meshed with the first and second bevel gears, respectively. The first and second gearboxes are mounted in a fixed relationship on a gas turbine engine casing and means are provided for disengagement of the transfer driveshaft from the first or inlet gear means without requiring any relative movement or partial disassembly of the second driveshaft or second gearbox assembly, including, a retainer pin, a retainer member mounted at one end of the pin, the pin being supported by one of the transfer gears, and means preventing disengagement of the retainer member and the gear. The means preventing disengagement of the pin and transfer gear is made accessible upon removal of the first bevel gear and driveshaft for quick disconnection of the retaining means and transfer gear, whereupon the retainer pin allows the transfer driveshaft to slide relative thereto and be disengaged from the first gearbox assembly so as to clear the assembly and allow removal of the latter from the engine without disturbance of or interference with the second gearbox assembly.

While the invention is believed to be distinctly pointed out by the claims appended thereto, other objects and advantages of the invention will become more apparent as the same become better understood with reference to the following specification and accompanying drawings in which:

FIG. 1 is a cross-sectional side view of the forward portion of an axial-flow jet engine illustrating the interior details of an inlet gearbox and the novel disconnecting means of my invention; and FIGS. 2 and 3 are enlarged cross-sectional views illustrating the retaining means for the radial or transfer driveshaft in the connected and disconnected positions, respectively.

While the invention is illustrated as embodied in the inlet and transfer gearboxes of a turbojet engine, it will be understood that it will have equal utility in any system of multiple, interconnected gearbox assemblies wherein it would otherwise be impossible to remove one of the gearboxes or assemblies with respect to any other without complete disengagement of both boxes from a common supporting structure due to the interengagement of gears and driveshafts thereof.

Turning now to the drawings, FIG. 1 is a cross-sectional view of the inlet area of a typical axial-flow turbojet engine. Indicated at numeral 10 is a front frame or compressor inlet casing. Directly behind the annular opening formed by the front frame are a plurality of inlet guide vanes, one of which is indicated at 12, which may be variable in attitude as shown in the drawings. Following the row of inlet guide vanes is the first "stage" of the compressor comprising a rotor wheel having a plurality of bladed members 14 followed by a row of stationary stator vanes 16. The compressor acts to compress the motive fluid (large arrow) entering the inlet area 18, and directs it to a combustor (not shown) and finally to the turbine (also not shown), as hereinabove described. Located centrally of the front frame of the compressor inlet is a shield or bullet-nose 20, shown in cutaway. Indicated generally at 22 is a front or inlet gearbox assembly, the inlet gearbox being drivingly connected to a transfer gearbox 24, the latter, in turn, being connected to a rear gearbox 26 in the illustrated embodiment. The gearboxes 22, 24 and 26 are all fixedly mounted with respect to each other on the engine casing structure, as indicated at 27.

Turning now to a detailed description of the inlet gearbox assembly, indicated at 28 is a front inlet casing half of which is attached to a rear inlet casing half 30 by fasteners or bolts 32. Using the same fastening means the assembled inlet gearbox casing halves may be supported from a member 34 attached to the front frame, which member, in turn, may be used to support bearing means 35 and seal means 36 for the main engine rotor shaft 37. Mounted within the casing halves 28 and 30 is a thrust bearing indicated at 38. Bearing means 38 is supported in the inlet casing, in a known manner, by an annular race or flange member 40 bolted thereto. Indicated at 42 is a horizontal bevel gear which is splined at 43 to a first or horizontal auxiliary driveshaft 44. The horizontal driveshaft is adapted to be rotatably supported at its front end by the thrust bearing 38 and is splined at 46 at its rear end to a hub portion 48 of the rotor shaft 37. Seal means 50 and a back-up plate 52 is provided for use with the thrust bearing 38 for securely containing the driveshaft 44 and bevel gear 42.

Drivingly engaged at 54 with the horizontal bevel gear 42 is a vertical or radial bevel gear indicated at 56. The radial bevel gear 56 is likewise supported for rotation through use of a thrust bearing 58 mounted in race or flange means 60 supported by the rear inlet casing half 30. At its upper or inlet gearbox end, the radial or vertical bevel gear 56 is loosely splined at 62 to a transfer or radial driveshaft, indicated generally at 64. Roller bearings 65 may also be provided to steady the rotational movement of the bevel gear 56 in the thrust bearing 58. The transfer driveshaft 64 is similarly connected with the second or transfer gearbox 24, as is more fully described hereinafter.

Turning now more specifically to FIGS. 2 and 3, indicated generally at 66 is the unique retaining means of my invention. This embodiment, which is used to effect quick disconnection between the inlet gearbox 22 and interconnecting driveshaft 64, comprises a generally cylindrical retainer member 68, a locking member in the form of a snapring 70, a dowel 72, and an elongated retainer pin, indicated generally at 74. The dowel 72 is used to connect the retainer member 68 with the radial bevel gear 56 for rotation therewith as well as to connect pin 74 with member 68. It will be noted that the retainer pin 74 includes an enlarged base portion 76 contained in a central bore 77 in the transfer driveshaft 64. The retainer member also includes a threaded portion 80 in the upper surface 81 thereof. Adjacent the upper end 86 of the hollow radial or vertical driveshaft 64 is a snapring 88 supported within an internal cavity 89 of the hollow gear 56. This snapring determines the upward or vertical limit of movement of the radial driveshaft which is loosely splined at 62 to the gear 56. The bottom end 90 of the radial driveshaft is prevented from undue longitudinal or vertical movement in the other (radial) direction by means of a similar snapring 92. The snapring is fixedly mounted in still another hollow cavity 98 of the bevel gear 93, which is loosely splined at 94 to the radial or vertical driveshaft 64. The latter, or vertical transfer bevel gear 93 is, in turn, drivingly engaged with a horizontal transfer bevel gear indicated at 95. This latter gear is similarly affixed to a horizontal, rear gearbox auxiliary driveshaft 95′ in a manner similar to the connecting means described above. Similarly, thrust bearing means 96 and roller bearing means 97 are also provided to rotatably support and steady the lower end of the radial driveshaft 64 in the transfer gearbox 24. It will be noted that the lower end of the radial driveshaft 64 is also loosely splined so as to be movable relative to the gear 93 in the cavity 98 therein.

As stated above, one of the problems connected with the removal of the inlet gearbox for say, inspection of the main rotor bearings or seal means, has arisen where the inlet gearbox indicated at 22 and the transfer gearbox indicated at 24 are both fixedly mounted with respect to each other on a common supporting structure, such as the outer casing of the gas turbine engine indicated at 27. In view of the close tolerances maintained between the aforementioned intermeshing bevel gears and other gearbox assembly components, it will be impossible to remove the inlet gearbox and disengage the horizontal auxiliary driveshaft 44 and rear means 42 from the gear 56 and transfer driveshaft 64 in the absence of my invention without at least partially dismantling a second or transfer gearbox 24 as well as all its associated external piping, in the process. Thus, when it is required to remove the inlet gearbox 22 for any reason whatever, first, the front inlet gearbox casing half 28 is unbolted from the rear casing half 30 and support member 34. This allows removal of the thrust bearing, and support means 38 and 40, and the horizontal auxiliary driveshaft 44. The driveshaft is disengaged at the splines 46 by forward movement, i.e., to the left in the drawing. To avoid interference of the enlarged portion of the driveshaft 44 with the roller bearings 65 the inner end of the shaft may be tilted upward slightly to clear the aforementioned bearings. At this point the rear casing half 30 will still be in position and surrounding the radial bevel gear 56. My invention provides means for disengaging the radial driveshaft 64 in a quick and expeditious manner. The snapring 70, being accessible after removal of the driveshaft assembly is easily disengaged, which allows retainer member 68 and pin 74 to move radially (vertically, in FIGS. 2 and 3) which permits the radial driveshaft 64 to drop down a distance "A" in FIG. 2 to rest upon snapring 92 in the transfer gearbox and provide clearance "B" in FIG. 3. This will permit removal of the remaining portions of the inlet gearbox, namely, the rear casing half 30, bearing means 58, and gear means 56. The seal 36, the main front rotor bearings 35 and the inner portion of the rotor shaft will now be accessible for inspection or maintenance. To re-assemble, a threaded member (i.e., bolt) is merely insert through the central opening left by removal of shield 20 and engaged with the threaded portion 80 of the retainer member 68 to draw the retainer pin and driveshaft 64 back into position where the snapring can again lock the retainer pin in position, i.e., complete the spline connection between the transfer or auxiliary driveshaft 64 and bevel gear 56.

Obviously, other embodiments and modifications of my invention will occur to those skilled in the art and it is my intention that such changes or modifications as are within the true scope and spirit of the invention will be included in the appended claims hereto.

What I intend to secure by Letters Patent is:

1. In a multiple gearbox assembly including first and second housing means fixedly mounted on common supporting structure, and intermediate gear driving means interconnecting said housing means, means to permit detachment of said intermediate gear driving means from one of said housing means for relative displacement thereof, comprising:

a retainer member;

an elongated member having one end thereof affixed to said retainer member, the other end thereof being slidably constrained in a bore in said intermediate gear driving means at the end of said gear driving means nearest said one of said housing means;

and removable locking means securing said retainer member in said one of said housing means, wherein removal of said locking means causes disconnection of said one end of said gear driving means from said one of said housing means, and movement of said other end of said gear driving means towards said other of said housing means, to permit the relative displacement between said gear driving means and said one of said housing means without any corresponding relative displacement between said first and second fixedly mounted housing means.

2. In a multiple gearbox assembly including first and second housing means fixedly mounted on common supporting structure, and intermediate gear driving means interconnecting said housing means, means to permit detachment of said intermediate gear driving means from one of said housing means for relative displacement thereof, comprising:

a cylindrical retainer block having a circumferential groove therein adjacent the upper surface thereof, an axial bore therethrough and a lateral through-hole intersecting said bore substantially at right angles thereto;

an elongated pin member, said pin member having one end thereof inserted in said axial bore, the other end thereof having an enlarged portion slidably constrained in a bore in said intermediate gear driving means at the end of said gear driving means nearest said one of said housing means;

and locking means removably securing said retainer block in said one of said housing means including a snapring located in said circumferential groove and a dowel pin located in said through-hole and inserted in an opening in said one end of said pin member, wherein removal of said snapring causes disconnection of said one end of said gear driving means from said one of said housing means, relative sliding movement of said elongated pin member in the bore in said gear driving means, and movement of said gear driving means and pin member towards said other of said housing means, to permit the relative displacement between said gear driving means and said one of said housing means without any corresponding relative displacement between said first and second fixedly mounted housing means.

3. In a gas turbine:

a first gearbox assembly including,
first housing means,
a first auxiliary driveshaft,
first bearing means rotatably supporting said first auxiliary driveshaft in said first housing means, and
first gear means affixed to one end of said first driveshaft;

a second gearbox assembly including,
second housing means,
a second auxiliary driveshaft,
second bearing means rotatably supporting said second auxiliary driveshaft in said second housing means, and
second gear means affixed to one end of said second driveshaft, said first and second housing means being fixedly supported on said gas turbine with respect to each other;

intermediate gear driving means for said first and second gear means interconnecting said first and second housing means;

and means to permit detachment of said intermediate gear driving means from one of said housing means for relative displacement thereof, comprising:

a retainer member;

an elongated member having one end thereof affixed to said retainer member, the other end thereof being slidably constrained in a bore in said intermediate gear driving means at the end of said gear driving means nearest said one of said housing means;

and removable locking means securing said retainer member in said one of said housing means, wherein removal of said locking means causes disconnection of said one end of said gear driving means from said one of said housing means, and movement of said other end of said gear driving means towards said other of said housing means, to permit the relative displacement between said gear driving means and said one of said housing means without any corresponding relative displacement between said first and second fixedly mounted housing means.

4. In a gas turbine:

a first gearbox assembly including,
first housing means,
a first auxiliary driveshaft,
first bearing means rotatably supporting said first auxiliary driveshaft in said first housing means, and
first gear means affixed to one end of said first driveshaft;

a second gearbox assembly including,
second housing means,
a second auxiliary driveshaft,
second bearing means rotatably supporting said second auxiliary driveshaft in said second housing means, and
second gear means affixed to one end of said second driveshaft, said first and second housing means being fixedly supported on said gas turbine with respect to each other;

a transfer driveshaft, said driveshaft being rotatably supported at each end thereof in said first and second housing means, respectively;

a pair of transfer gear means, one of said pair being connected to said transfer driveshaft at each end thereof;

and means to permit detachment of said transfer driveshaft from one of said transfer gear means for displacement of said transfer driveshaft with respect to one of said gearbox assemblies without relative displacement between said first and second housing means comprising, a retainer member, an elongated pin affixed at one end thereof to said retainer member, said pin being slidably supported by said retainer member with respect to one of said transfer gear means in a central cavity therein, and a locking member removably securing said retainer member at said one of said transfer gear means, the other end of said retainer pin being slidably supported in a bore at one end of said transfer driveshaft, wherein removal of said locking member causes disengagement of said one of said transfer gear means and said transfer driveshaft to permit said one end of said transfer driveshaft to clear said one of said gearbox assemblies.

5. In a gas turbine:
   a first gearbox assembly including,
      first housing means,
      a first auxiliary driveshaft,
      first bearing means rotatably supporting said first auxiliary driveshaft in said first housing means, and
      first gear means affixed to one end of said first driveshaft;
   a second gearbox assembly including,
      second housing means,
      a second auxiliary driveshaft,
      second bearing means rotatably supporting said second auxiliary driveshaft in said second housing means, and
      second gear means affixed to one end of said second driveshaft, said first and second housing means being fixedly supported on said gas turbine with respect to each other;
   intermediate gear driving means for said first and second gear means interconnecting said first and second housing means;
      and means to permit detachment of said intermediate gear driving means from one of said housing means for relative displacement thereof comprising,
      a cylindrical retainer block having a circumferential groove therein adjacent the upper surface thereof, an axial bore therethrough and a lateral through-hole intersecting said bore substantially at right angles thereto;
      an elongated pin member, said pin member having one end thereof inserted in said axial bore, the other end thereof having an enlarged portion slidably constrained in a bore in said intermediate gear driving means at the end of said gear driving means nearest said one of said housing means;
      and locking means removably securing said retainer block in said one of said housing means including a snapring in said circumferential groove and a dowel pin located in said through-hole and inserted in an opening in said one end of said pin member, wherein removal of said snapring causes disconnection of said one end of said gear driving means from said one or said housing means, relative sliding movement of said elongated pin member in the bore in said gear driving means, and movement of said gear driving means and pin member towards said other of said housing means, to permit the relative displacement between said gear driving means and said one of said housing means without any corresponding relative displacement between said first and second fixedly mounted housing means.

References Cited by the Examiner

UNITED STATES PATENTS 2,950,934   8/1960   Uebing _____ 287—53

MILTON KAUFMAN, *Primary Examiner.*